United States Patent
Kady et al.

(10) Patent No.: US 8,539,283 B2
(45) Date of Patent: Sep. 17, 2013

(54) SYSTEM AND METHOD FOR EXECUTING A HIGH-RELIABILITY APPLICATION

(75) Inventors: Mark A. Kady, Greentown, IN (US); Timothy J. Newman, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 329 days.

(21) Appl. No.: 13/009,931

(22) Filed: Jan. 20, 2011

(65) Prior Publication Data

US 2012/0192017 A1    Jul. 26, 2012

(51) Int. Cl.
*G06F 11/00* (2006.01)

(52) U.S. Cl.
USPC .................. 714/38.1; 714/2; 714/48

(58) Field of Classification Search
USPC .......................... 714/38.1, 1, 2, 48
See application file for complete search history.

(56) References Cited

U.S. PATENT DOCUMENTS

| 7,796,081 B2 * | 9/2010 | Breed ............................ 342/70 |
| 2010/0083254 A1 * | 4/2010 | Takahashi et al. ............ 718/100 |

OTHER PUBLICATIONS

Stajano, et al.: "The Grenade Timer: Fortifying the Watchdog Timer Against Malicious Mobile Code", undated, pp. 1-5.

* cited by examiner

*Primary Examiner* — Yolanda L Wilson
(74) *Attorney, Agent, or Firm* — Thomas N. Twomey

(57) ABSTRACT

A system for executing a high-reliability application and a third party application is provided. The system includes an application module and a second module. The application module has control logic for executing the high reliability application and the third party application. The high reliability application generates a message sequence. The application module includes a normal operating mode, a high reliability mode, and a high reliability boot. The second module is in communication with the application module, and includes a first control logic for monitoring the message sequence when the application module is operating in the normal operating mode. The second module also includes control logic for initiating the high reliability boot in the application module.

19 Claims, 4 Drawing Sheets

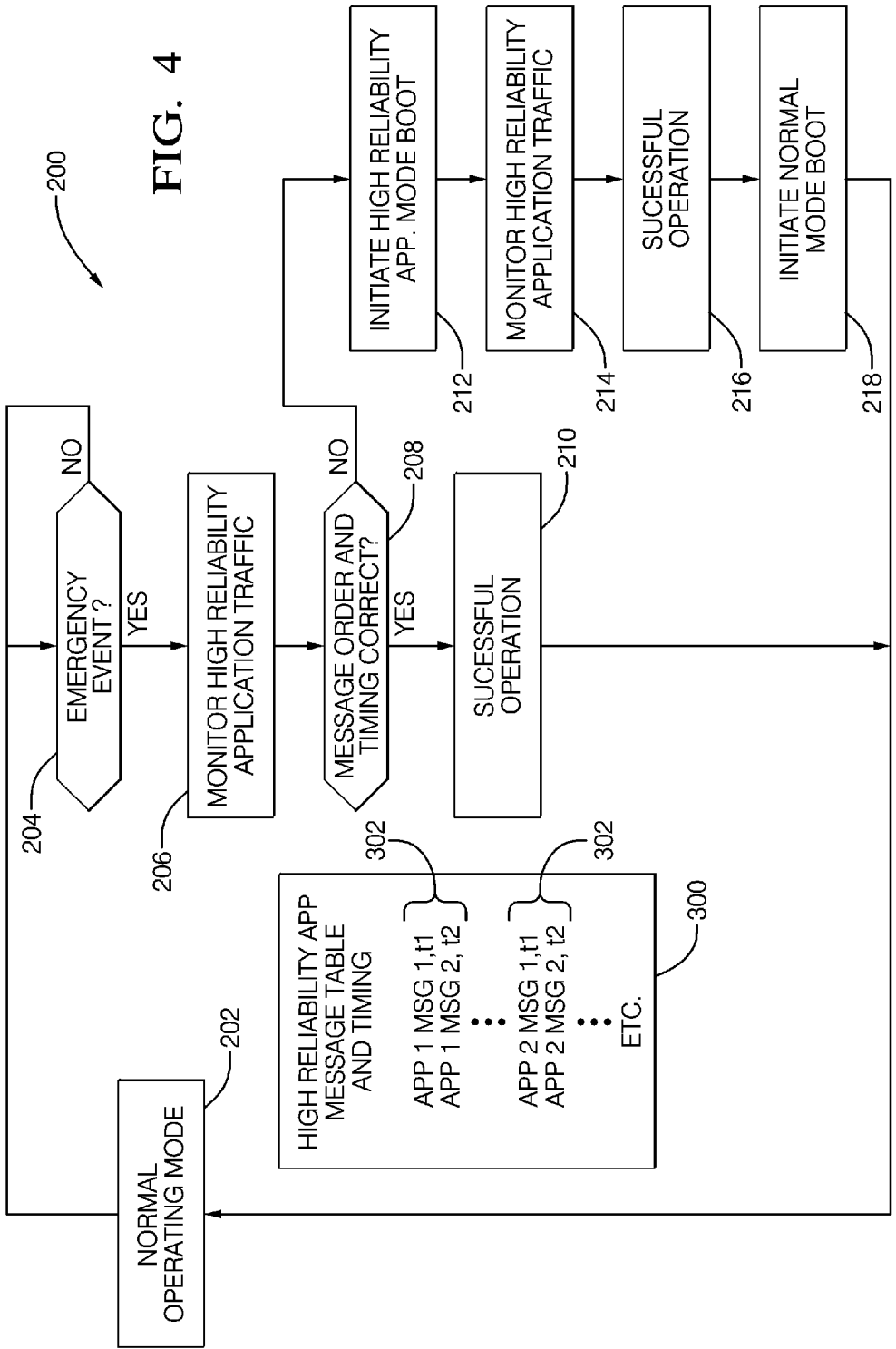

SYSTEM AND METHOD FOR EXECUTING A HIGH-RELIABILITY APPLICATION

BACKGROUND OF THE INVENTION

The present invention relates to a system and method for executing a high-reliability application and in particular to a system and method of executing a high-reliability application using multiple modules.

Some types of control modules allow for third party applications as well as high-reliability applications to run concurrently. It is typically desirable to have both the third party application as well as the high-reliability applications executed on the same control module in an effort to reduce cost and complexity of the system. For example, a telematics control module executes a high-reliability application such as an airbag emergency application that contacts an emergency call center if an airbag is deployed. The telematics control module also executes a third-party application downloaded from a smartphone. However, sometimes it is difficult to guarantee the high-reliability applications will execute in an emergency condition if a third party application is running at the same time. Therefore, there are several approaches that are currently employed to ensure that the high-reliability applications will execute when needed.

In one approach, the control module is partitioned such that the high-reliability applications are executed on one microcomputer, while the third-party applications are executed on another microcomputer. While this approach allows for the high-reliability applications to execute under all conditions as required, having multiple microcomputers capable of running complex applications can add to the cost and complexity of the system. The cost and complexity of the system can be especially high if the multiple microcomputers share resources.

In an alternative approach, hypervisor technology is implemented in the control module. The high-reliability applications are run on one operating system while the third-party applications are run on another operating system. The hypervisor technology allows for both the operating systems to share a single microprocessor and memory. The hypervisor controls the microprocessor and allocates what is needed for each operating system. However, complications may arise when attempting to debug both of the operating systems.

SUMMARY OF THE INVENTION

A simple, cost-effective system that executes both high-reliability applications as well as third-party applications is provided. The system includes an application module and a second module. The application module has control logic for executing the high reliability application and the third party application. The high reliability application generates a message sequence. The application module includes a normal operating mode having the high-reliability application and the third party application executable, a high reliability mode having only the high-reliability application executable, and a high reliability boot having the application module re-booted into the high reliability mode. The second module is in communication with the application module. The second module includes a first control logic for monitoring the message sequence when the application module is operating in the normal operating mode, a second control logic for determining if the message sequence generates indicator that signifies that an error has occurred as the high-priority application executes, and a third control logic for initiating the high reliability boot in the application module if the message sequence generates the indicator.

A method of executing a high-reliability application and a third party application is also provided. The method includes providing an application module. The application module has control logic for executing the high reliability application and the third party application. The application module is operated at a normal operating mode. The normal operating mode has the high-reliability application and the third party application executable. The high-reliability application is monitored, where the high-reliability application generating a message sequence. The message sequence generates an indicator that signifies that an error has occurred as the high-priority application executes. A high reliability boot is initiated in the application module if the message sequence generates the indicator. The high reliability boot re-boots the application module into a high reliability mode. The high reliability mode has only the high-reliability application executable.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 4 is a process flow diagram illustrating a method of the invention.

DETAILED DESCRIPTION

Figure 1:
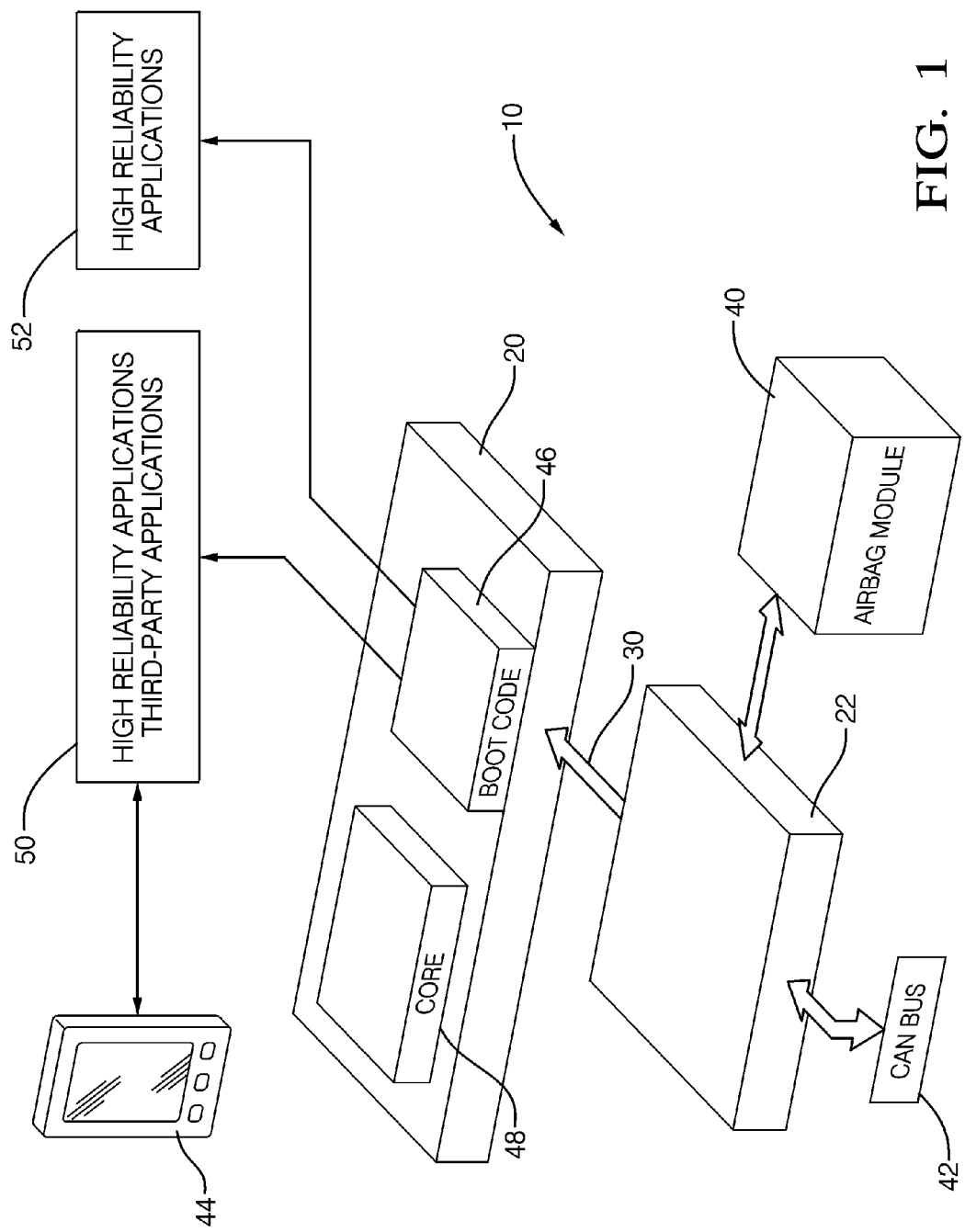
FIG. 1 is a schematic illustration of a system having an application module and a second module.

Referring now to the Figures, where the invention will be described with reference to specific embodiments, without limiting same, FIG. 1 illustrates a computing system 10 in accordance with the present invention. In the exemplary embodiment as shown, the computing system 10 is a computing system having multiple modules for executing multiple applications. As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality. It will be appreciated that like elements are described with like numerals throughout this disclosure. Where alternative embodiments of like elements are shown, a prefix numeral may be added to distinguish the element from alternative embodiments.

The computing system 10 includes an application module 20 and a second module 22 that are in communication with one another through a data connection 30. The application module 20 is any type of control module used to execute software programs for the computing system 10 or for other systems that are related to the functionality of the computing system 10. The second module 22 monitors and sends control messages to the application module 20. In the exemplary embodiment as shown in FIG. 1, the second module 22 is also in communication with an airbag module 40 and a vehicle bus 42. The second module 22 is generally programmed with the minimal operating system and software needed to monitor the application module 20, the airbag module 40 and the vehicle bus 42, as well as to send messages to the application module 20 during specific events. The second module 22 also has a limited code base and generally does not include third party applications. Although FIG. 1 illustrates the airbag module 40 and the vehicle bus 42 separately, it is understood that the vehicle bus 42 could also carry messages indicating the status of the airbag module 40 as well, thus requiring the second module 22 to only be in communication with the vehicle bus 42. In the non-limiting embodiment as shown, the application module 20 is a telematics control module for a vehicle (not shown), and the second module 22 is in communication with a vehicle bus 42 and an airbag module 40. However, it is understood that the computing system 10 may also be used in other applications as well.

In the non-limiting embodiment as shown, the application module 20 has control logic for executing high-reliability applications as well as third party applications. The high-reliability application is an application that should be reasonably assured to be executable by the application module 20 in an emergency situation, or at least take precedence over other applications. In the non-limiting embodiment as shown generally in FIGS. 1-4, the emergency situation represents an airbag being deployed. The high reliability application is a telematics notification system that notifies an emergency call center if the airbag module 40 indicates that an airbag (not shown) has deployed. The third party applications are downloaded from a device other than the application module 20. In the non-limiting embodiment as shown in FIG. 1, the third party applications are downloadable from a portable electronic device such as, for example, a smartphone 44 that employs the Android operating system.

The application module 20 includes a memory 46 and a core 48. In the non-limiting embodiment as shown, the application module 20 includes a single core 48, however it is understood that a dual-core or a multi-core processor may be employed as well. The memory 46 includes boot code that is used to boot the core 48. The boot code causes the application module 20 to operate in one of two different modes. Specifically, the application module 20 includes a normal operation mode 50 and a high-reliability mode 52. The normal operation mode 50 allows the application module 20 to execute both the high-reliability applications as well as the third party applications. The high-reliability mode 52 only allows for the high-reliability applications to execute. The application module 20 switches between the normal operation mode 50 and the high-reliability mode 52 by re-booting. Specifically, the boot code stored in the memory 46 includes a high reliability boot and a normal boot. The normal boot causes both the high reliability applications, third party applications, and all related software to load, where the application module 20 operates in the normal operating mode 50. The high reliability boot causes only the high reliability applications to load, where the application module 20 only operates in the high-reliability mode 52.

Figure 2:
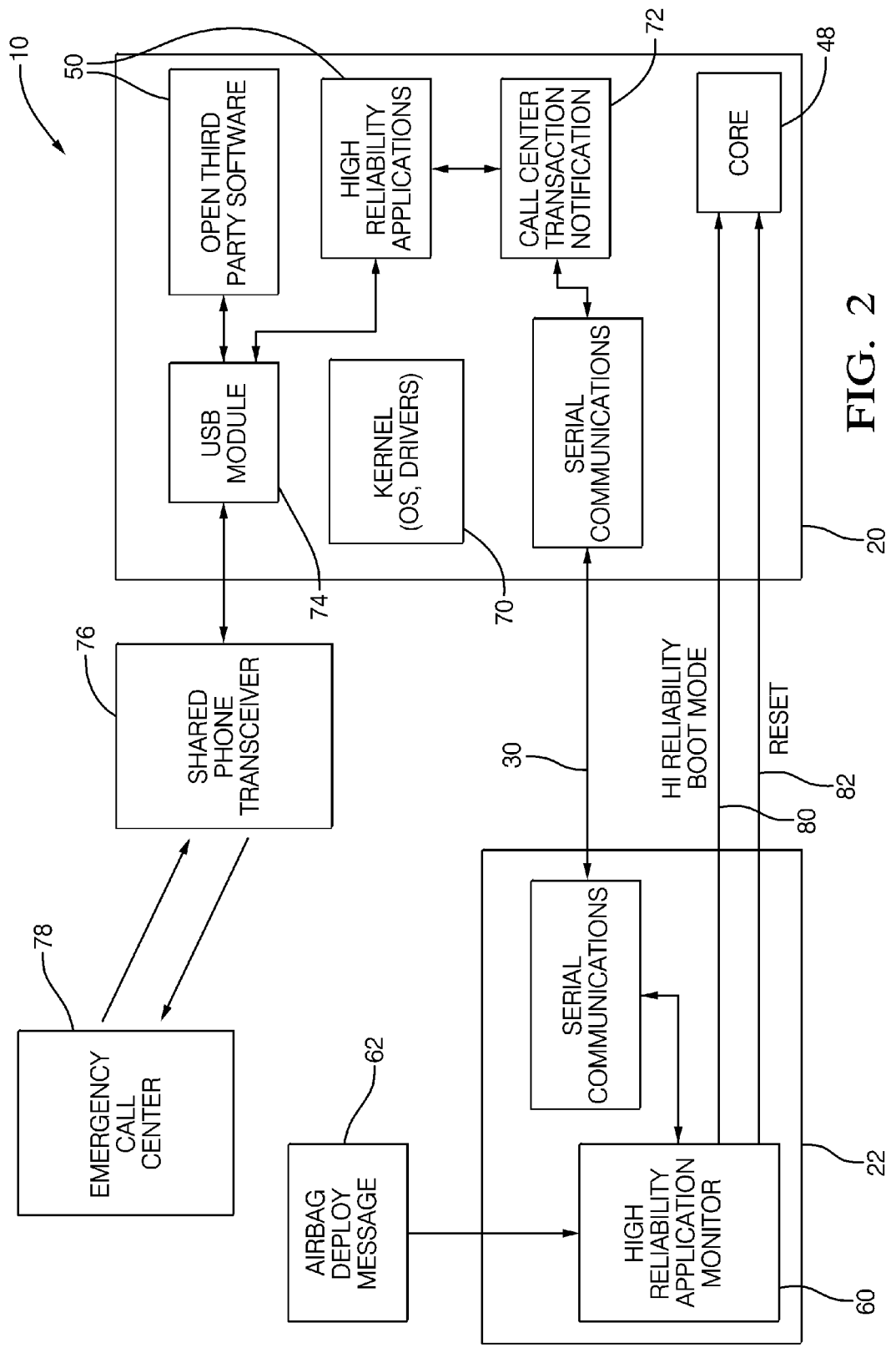
FIG. 2 is block diagram of the system shown in FIG. 1 in a normal operating mode.
Figure 3:
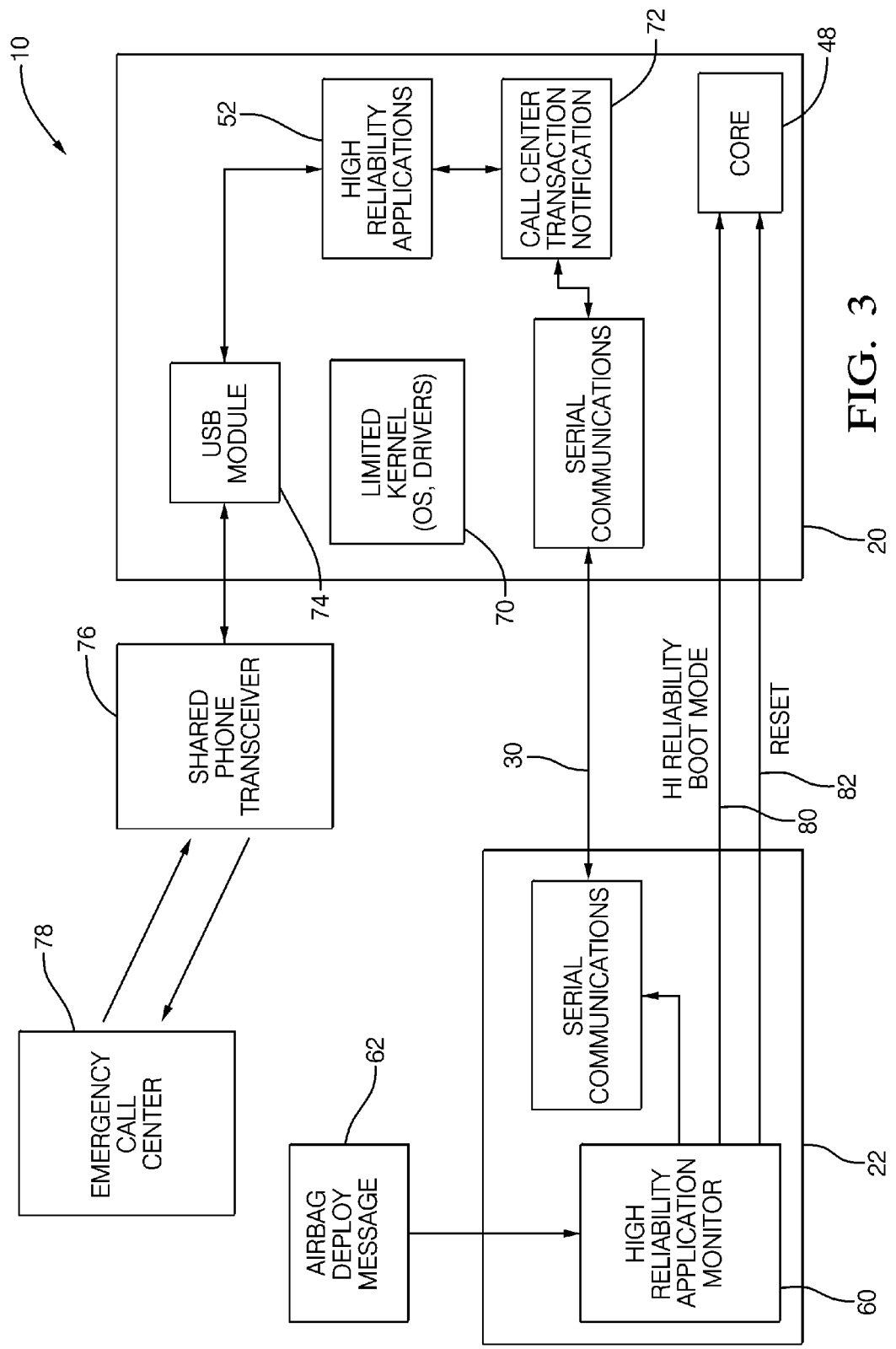
FIG. 3 is a block diagram of the system shown in FIG. 1 in a high reliability operating mode.

FIGS. 2-3 illustrate a block diagram of the computing system 10, where FIG. 2 shows the computing system 10 in the normal operation mode and FIG. 3 shows the computing system 10 in the high reliability mode. Referring now to FIG. 2, the second module 22 includes a high reliability application monitor 60 that is in communication with the airbag module 40 and the vehicle bus 42 (shown in FIG. 1). Specifically, the high reliability application monitor 60 receives an emergency event notification message 62 from the airbag module 40 or the vehicle bus 42. The emergency notification message 62 indicates that an emergency situation has occurred. During an emergency situation, the high-reliability application should be reasonably guaranteed to be executable by the application module 20. In the non-limiting embodiment as shown, the emergency notification message 62 is an airbag deployment message indicating that an airbag (not shown) has deployed. FIG. 2 also illustrates the second module 22 in serial communication with the application module 20 through the data connection 30, where the high reliability application monitor 60 sends and receives serial communication data from the application module 20.

In the normal operation mode as shown in FIG. 2, the application module 20 has both the high-reliability applications as well as the third party applications loaded and is in the normal operating mode 50. The application module 20 has also loaded all kernel module, drivers and applications 70 that are needed for executing the high-reliability applications as well as the third party applications. In the non-limiting embodiment as shown, the high-reliability application is a call center transaction notification application 72. The application module 20 includes a USB module 74 that is in communication with a transceiver 76. The USB module 74 also communicates with the high-reliability applications as well as the third party applications. The transceiver 76 is configured to send and receive radio frequency (RF) signals to make a call to an emergency call center 78 if an emergency notification message 62 is sent.

In the event that the emergency notification message 62 is sent to the high reliability application monitor 60 of the second module 22, the high reliability application monitor 60 sends serial communication to the application module 20 though the data connection 30. The call center transaction notification application 72 receives the serial communication containing messages and commands, and communicates the information to the USB module 74. The USB module is in communication with the transceiver 76, which directs a cellular telephone call to the emergency call center 78. The USB module 74 reports back to the call center transaction notification application 72 the status of the sequence of messages and commands sent to the transceiver 76. Specifically, failure, retry, or time of success for each of the messages attempted at the transceiver 76 is reported back to the call center transaction notification application 72 as the high-reliability application executes. This data is then transmitted from the call center transaction notification application 72 back to the high reliability application monitor 60 of the second module 22. If the high reliability application monitor 60 determines that the call center transaction notification application 72 completed successfully, the application module 20 continues operation in normal mode 50.

Continuing to refer to FIG. 2, the high reliability application monitor 60 of the second module 22 includes circuitry or digital logic for monitoring the messages created by the application module 20 to determine if an indicator has been generated that signifies that an error has occurred while the high-reliability application executes. Specifically, in the embodiment as shown, the application monitor 60 is in communication with the call center transaction notification application 72 though the data connection 30. In one embodiment, the application monitor 60 includes circuitry or digital logic for determining if the messages are generated in the correct sequence and at specified timing intervals. For example, a timer could be employed to determine if the sequence of messages to the transceiver 76 are successful at predetermined time intervals. Alternatively, in another embodiment, the application monitor 60 could include circuitry or digital logic for monitoring the messages generated by the application module 20 to determine if an error code has been generated. For example, the application monitor 60 could determine if the communication received from the call center transaction notification application 72 has an error code explicitly encoded in the communication.

If data from the application module 20 received through the data connection 30 to the high reliability application monitor 60 indicates an error or a fault condition has occurred as the high-reliability application executes, the core 48 will then perform the high reliability boot where only the high reliability applications are loaded. The application monitor 60 communicates two different signals to the core 48. A first line 80 communicates a mode flag to the core 48 which instructs the core 48 to re-boot into either the normal operation mode 50 or the high-reliability mode 52. The second line 82 sends a reset signal to the core 48 to initiate a change between the normal operation mode and the high-reliability mode. The second module 22 asserts a high-reliability command flag through the first line 80 to the core 48, and then activates the reset line to the core 48. This will cause the application module 20 to boot into the high-reliability mode 52.

When the core 48 re-boots, the application module 20 operates in the high-reliability mode as illustrated in FIG. 3. In the high-reliability mode, the application module 20 is in the high-reliability operating mode 52. The application module 20 has only loaded the kernel module, drivers and applications 70 that are needed for executing the high-reliability applications. Because only a limited number of applications have been loaded, the core 48 can be re-booted into the high-reliability mode more quickly when compared to the time needed to load both the applications as well as the third party applications. Therefore, errors created by executing the third-party applications do not occur in the high-reliability mode, as the third party applications have not been loaded. This reasonably guarantees that a high-reliability application should successfully execute when otherwise previously disrupted or prevented by a third party application. Moreover, the application module 20 is programmed with the minimal operating system and software needed to execute the call center transaction notification application 72 and send messages to the USB module 74 and transceiver 76. Therefore, the computing system 10 executes high-reliability applications during emergency situations successfully while also employing a cost-effective approach.

Once the high-reliability application has executed completely, then the application module 20 can be re-booted back into the normal operating mode 50. The normal boot causes both the high reliability applications, third party applications, and all related software to load, thus allowing the application module 20 to operate in the normal operating mode 50 that is illustrated in FIG. 2. Specifically, the second module 22 is in serial communication with and monitors the application module 20 to determine if the high-reliability application has competed executing. Once the high-reliability application has competed, two possibilities exist for the second module 22. If the application module 20 is operating in normal mode 50, then no failures were detected and normal operation continues for the application module 20. The second possibility is that the application module 20 is operating in high-reliability operating mode 52. In this case the second module 22 can restore normal operation 50 of application module 20 by de-asserting the high-reliability command flag to the core 48 and then activating the reset line to the core 48. This will cause the application module 20 to boot into the normal mode 50.

A method of monitoring the application module 20 will now be explained. Referring to FIG. 4, an exemplary process flow diagram illustrating an exemplary process of monitoring the application module 20 is generally indicated by reference number 200. Process 200 begins at step 202, where the application module 20 operates at a normal running or operating mode 202. Referring specifically to FIG. 2, the second module 22 is in serial communication with the application module 20 through the data connection 30, where a high reliability application monitor 60 sends and receives serial communication data from the application module 20. In the normal operation mode, the application module 20 has both the high-reliability applications as well as the third party applications loaded. In the non-limiting embodiment as shown, the high-reliability application is a call center transaction notification application 72. The application module 20 includes a USB module 74 that is in communication with a transceiver 76 used to call to an emergency call center 78 if an emergency notification message 62 has been sent. Method 200 may then proceed to step 204.

In step 204, the second module 22 includes control logic for determining if an emergency situation has occurred. Referring to FIG. 1, the high reliability application monitor 60 is in communication with an airbag module 40 and a vehicle bus 42. Turning to FIG. 2, the high reliability application monitor 60 can receive an emergency event notification message 62 from the airbag module 40 or the vehicle bus 42. The emergency notification message 62 indicates that an emergency situation has occurred. The method 200 continues to remain in step 204 until an emergency situation has occurred. Once an emergency situation occurs then method 200 then proceeds to step 206.

In step 206, the second module 22 includes control logic for monitoring the high-reliability application message traffic from the application module 20. FIG. 2 shows the second module 22 in serial communication with the application module 20 through a data connection 30, where the high reliability application monitor 60 sends and receives serial communication data from the application module 20. Method 200 may then proceed to step 208.

In step 208, the high reliability application monitor 60 of the second module 22 includes control logic for monitoring a message sequence generated by the execution of the high-reliability application to determine if an error has occurred. Specifically, referring to a High-Reliability Application Message Table 300, each high reliability application generates a message sequence 302 while executing. In the non-limiting embodiment as shown, a first high-reliability application (App 1) and a second high-reliability application (App 2) are each generating a message sequence order (Msg 1, Msg 2, etc.) at a predetermined time interval (t1, t2, etc.). Specifically, each message corresponds to a specific time interval such that a first message Msg 1 corresponds to a first predetermined time t1, a second message Msg 2 corresponds to a second predetermined time t2, and so on. The high reliability application monitor 60 of the second module 22 includes control logic for determining if the message orders Msg 1, Msg 2, etc. are performed in the correct sequence and at the correct predetermined time intervals t1, t2, etc. If the timing is exceeded, or if the messages are missing or received in the wrong order, this indicates that an error or fault condition has occurred as the high-reliability application has executed. It should be noted that while FIG. 4 illustrates the high-reliability application monitor 60 determining if the message orders are performed in the correct sequence and at the correct predetermined time intervals, an error condition could be detected using other approaches as well. For example, in another embodiment the application monitor 60 could monitor the messages generated by the application module 20 to determine if an error code has been generated.

If the message sequence 302 does not generate an error, then method 200 may proceed to step 210, where the high reliability application continues to execute until completed. Method 200 may then proceed back to normal operating mode step 202, and can be executed again. However, if the message sequence 302 indicates an error or a fault condition has occurred as the high-reliability application executes, then method 200 proceeds to step 212.

In step 212, the high-reliability boot is initiated, and the application module 20 is operated in the high-reliability application mode. Specifically, referring to FIG. 2, the high reliability application monitor 60 is in communication with the application module 20 by with a first line 80 and a second line 82. The first line 80 communicates a mode flag to the core 48 which instructs the core 48 to re-boot into either the normal operation mode 50 or the high-reliability mode 52. The second line 82 sends a reset signal to the core 48 to initiate a change between the normal operation mode and the high-reliability mode. If message sequence 302 indicates an error or a fault condition has occurred as the high-reliability application executes, then the second module 22 asserts a high-reliability command flag through the first line 80 to the core 48, and activates the reset line to the core 48. This will cause the application module 20 to boot into the high-reliability mode 52. Method 200 then proceeds to step 214.

In step 214, the second module 22 includes control logic for monitoring the high-reliability application message traffic from the application module 20. Method 200 may then proceed to step 216.

In step 216, the high reliability application has completed, and is finished executing. Method 200 may then proceed to step 218.

In step 218, the application module 20 is re-booted back into a normal operating mode 50. The normal boot causes both the high reliability applications, third party applications, and all related software to load, thus allowing the application module 20 to operate in the normal operating mode 50. Referring to FIGS. 2-3, the second module 22 is in serial communication with and monitors the application module 20 to determine if the high-reliability application has competed executing. Once the high-reliability application has completed, the high-reliability command flag to the core 48 is de-asserted and the reset line to the core 48 is activated. This will cause the application module 20 to boot into the normal mode 50. Method 200 then proceeds back to step 202, and can be executed again.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A system for executing a high-reliability application and a third party application, comprising:
an application module having control logic for executing the high reliability application and the third party application, the high reliability application generating a message sequence, the application module comprising:
a normal operating mode having the high-reliability application and the third party application executable;
a high reliability mode having only the high-reliability application executable; and
a high reliability boot having the application module re-booted into the high reliability mode;
a second module in communication with the application module, the second module comprising:
a first control logic for monitoring the message sequence of the application module when the application module is operating in the normal operating mode;
a second control logic for determining if the message sequence has generated an indicator that signifies that an error has occurred as the high application executes; and
a third control logic for initiating the high reliability boot in the application module if the message sequence has generated the indicator.

2. The system as recited in claim 1, the second module including a fourth control logic for monitoring an external message source, the second module configurable to receive a notification message from the message source, wherein the notification message indicates that the high-reliability application is to be executed by the application module.

3. The system as recited in claim 2, wherein the message source is at least one of a vehicle bus and an airbag module.

4. The system as recited in claim 2, wherein the second module is in communication with the application module to send the notification message from the second module to the application module.

5. The system as recited in claim 2, wherein the second module includes control logic for determining if the message sequence is generated in a predetermined order and at predetermined time intervals, the indicator being generated if the message sequence is not generated in the predetermined order at predetermined time intervals.

6. The system as recited in claim 2, wherein the second module includes control logic for determining if an error code has been generated, the indicator being the error code.

7. The system as recited in claim 2, wherein the second module communicates a mode flag to the application module through a first data communication line, the mode flag being configured to instruct the application processor to re-boot into one of the normal operation mode and the high-reliability mode.

8. The system as recited in claim 7, wherein the second module communicates a reset signal to the application module through a second data communication line to initiate a change between the normal operation mode and the high-reliability mode.

9. The system as recited in claim 8, wherein the application module includes a normal boot having the application module re-booted to load both the high-reliability application and the third party application.

10. The system as recited in claim 2, wherein the high-reliability application is a notification system that notifies an emergency call center.

11. A method of executing a high-reliability application and a third party application, comprising:
providing an application module, the application module having a control logic for executing the high reliability application and the third party application;

operating the application module at a normal operating mode, the normal operating mode having the high-reliability application and the third party application executable;

monitoring the high-reliability application, the high-reliability application generating a message sequence;

determining if the message sequence has generated an indicator that signifies that an error has occurred as the high-priority application executes; and initiating a high reliability boot in the application module if the message sequence has generated the indicator, to re-boot the application module into a high reliability mode, the high reliability mode having only the high-reliability application executable.

12. The method as recited in claim 11, including executing the high reliability application until the high reliability application is finished executing.

13. The method as recited in claim 12, including re-booting the application module back into the normal operating mode.

14. The method as recited in claim 11, including sending the notification message from the second module to the application module.

15. The method as recited in claim 11, including determining if the message sequence is generated in a predetermined order and at predetermined time intervals, the indicator being generated if the message sequence is not generated in the predetermined order at predetermined time intervals.

16. The method as recited in claim 11, including determining if an error code has been generated, the indicator being the error code.

17. The method as recited in claim 11, including communicating a mode flag to the application module through a first data communication line, the mode flag instructing the application processor to re-boot into one of the normal operation mode and the high-reliability mode.

18. A system for executing a high-reliability application and a third party application, comprising:

an application module having control logic for executing the high reliability application and the third party application, the high reliability application generating a message sequence, the application module comprising:
 a normal operating mode having the high-reliability application and the third party application executable;
 a high reliability mode having only the high-reliability application executable; and
 a high reliability boot having the application module re-booted into the high reliability mode;

an external message source that generates a notification message indicating the high-reliability application is to be executed by the application module;

a second module in communication with the application module and the external message source, the second module comprising:
 a first control logic for monitoring the message sequence of the application module when the application module is operating in the normal operating mode;
 a second control logic for receiving the notification message from the external message source and sending the notification message to the application module;
 a third control logic for determining if the message sequence is generated in a predetermined order at predetermined time intervals; and
 a fourth control logic for initiating the high reliability boot in the application module if the message sequence is not generated in the predetermined order at predetermined time intervals.

19. The system as recited in claim 18, wherein the second module communicates a mode flag to the application module through a first data communication line, the mode flag configured to instruct the application processor to re-boot into one of the normal operation mode and the high-reliability mode, and wherein the second module is configured to communicate a reset signal to the application module through a second data communication line to initiate a change between the normal operation mode and the high-reliability mode.

* * * * *